(12) United States Patent
Blackmon et al.

(10) Patent No.: US 7,650,259 B2
(45) Date of Patent: Jan. 19, 2010

(54) METHOD FOR TUNING CHIPSET PARAMETERS TO ACHIEVE OPTIMAL PERFORMANCE UNDER VARYING WORKLOAD TYPES

(75) Inventors: Herman L. Blackmon, Moline, IL (US); Joseph A. Kirscht, Rochester, MN (US); David A. Shedivy, Rochester, MN (US); Brian T. Vanderpool, Byron, MN (US)

(73) Assignee: International Business Machines Corporation, Armonk, NY (US)

( * ) Notice: Subject to any disclaimer, the term of this patent is extended or adjusted under 35 U.S.C. 154(b) by 277 days.

(21) Appl. No.: 11/865,545

(22) Filed: Oct. 1, 2007

(65) Prior Publication Data

US 2009/0089554 A1    Apr. 2, 2009

(51) Int. Cl.
    *G06F 19/00* (2006.01)
(52) U.S. Cl. ...................................... 702/182; 711/100
(58) Field of Classification Search ................ 702/182, 702/183, 185, 188, 75, 76, 78, 79, 176, 178; 711/100, 167; 712/26, 225
    See application file for complete search history.

(56) References Cited

U.S. PATENT DOCUMENTS

| | | | |
|---|---|---|---|
| 5,860,106 A * | 1/1999 | Domen et al. | 713/324 |
| 6,065,089 A * | 5/2000 | Hickerson et al. | 710/266 |
| 2004/0267395 A1* | 12/2004 | Discenzo et al. | 700/99 |
| 2005/0144498 A1* | 6/2005 | Lin | 713/600 |
| 2009/0204237 A1* | 8/2009 | Sustaeta et al. | 700/36 |

* cited by examiner

*Primary Examiner*—Edward Raymond
(74) *Attorney, Agent, or Firm*—Dillon & Yudell LLP

(57) ABSTRACT

A method, system, and computer program product for tuning a set of chipset parameters to achieve optimal chipset performance under varying workload characteristics. A set of workload characteristics of a current workload type is determined. An instruction stream is generated using weighted parameters derived from the set of workload characteristics of the current workload type. A set of chipset parameters is generated and integrated within the instruction stream. The instruction stream is loaded to one or more processors and executed to collect and analyze performance data relating to the chipset's performance. The analysis includes comparing the set of performance data of a plurality of different instruction streams having the same set of workload characteristics. Each executed instruction stream is executed with at least one different combination of chipset parameters. A determination is made regarding which combination of chipset parameters provides the best performance data for the current workload.

12 Claims, 5 Drawing Sheets

METHOD FOR TUNING CHIPSET PARAMETERS TO ACHIEVE OPTIMAL PERFORMANCE UNDER VARYING WORKLOAD TYPES

BACKGROUND OF THE INVENTION

1. Technical Field

The present invention generally relates to computer systems and in particular to design tools in computer systems.

2. Description of the Related Art

Chipsets for high-performance and high-reliability servers support a multitude of Basic Input/Output System (BIOS) updatable registers that are used to set modes and thresholds that will influence how the chipset will operate. The chipset designers implement the modes and thresholds to give software the ability to set the modes/thresholds of a chipset (or chipset parameters) in a way that produces the best performance results. Typically, the parameters of a chipset are tuned on a performance test bed which requires considerable hardware resources, as well as significant amounts of time and expense. In addition, there is often scheduling pressure to bring the product to market, which limits the ability to adequately tune the chipset parameters.

Also, all chipset testing that is done before reaching the performance test bed stage of testing will have potentially been run with different mode/threshold settings. As a result, this practice can potentially mask chipset bugs that would not be exposed until reaching the performance test bed stage of testing. If a chipset bug associated with a particular combination of mode/threshold settings is not uncovered through chipset testing before the chipset is tested on the performance test bed, a database crash may occur, requiring many hours to restore the database. Given the interdependency between mode/threshold values, it is critical that various chipset mode/threshold combinations be tested before reaching the performance test bed stage.

SUMMARY OF AN EMBODIMENT

Disclosed are a method, system, and computer program product for tuning a set of chipset parameters to achieve optimal chipset performance under varying workload characteristics. A set of workload characteristics of a current workload type is determined. An instruction stream is then generated using weighted parameters derived from the set of workload characteristics of the current workload type. In addition, a set of modes and thresholds for a chipset being tested is generated. In this regard, the combination of modes and thresholds define a combination of chipset parameters. The generated set of modes and thresholds within the instruction stream is then integrated within the instruction stream. The instruction stream is loaded to a master processor and one or more slave processors, and is then executed. Performance data relating to the execution of the instruction stream is collected for subsequent analysis. The analysis includes comparing the set of performance data of a plurality of different instruction streams having the same set of workload characteristics. In this regard, each executed instruction stream is executed with at least one different combination of chipset parameters. A determination is made regarding which combination of chipset parameters provides the best performance data for the current workload type.

The above, as well as additional objectives, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF AN ILLUSTRATIVE EMBODIMENT

The illustrative embodiments provide a method, system, and computer program product for tuning a set of chipset parameters to achieve optimal chipset performance under varying workload characteristics, in accordance with one embodiment of the invention.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined only by the appended claims.

It is understood that the use of specific component, device and/or parameter names are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that term is utilized.

Figure 1:
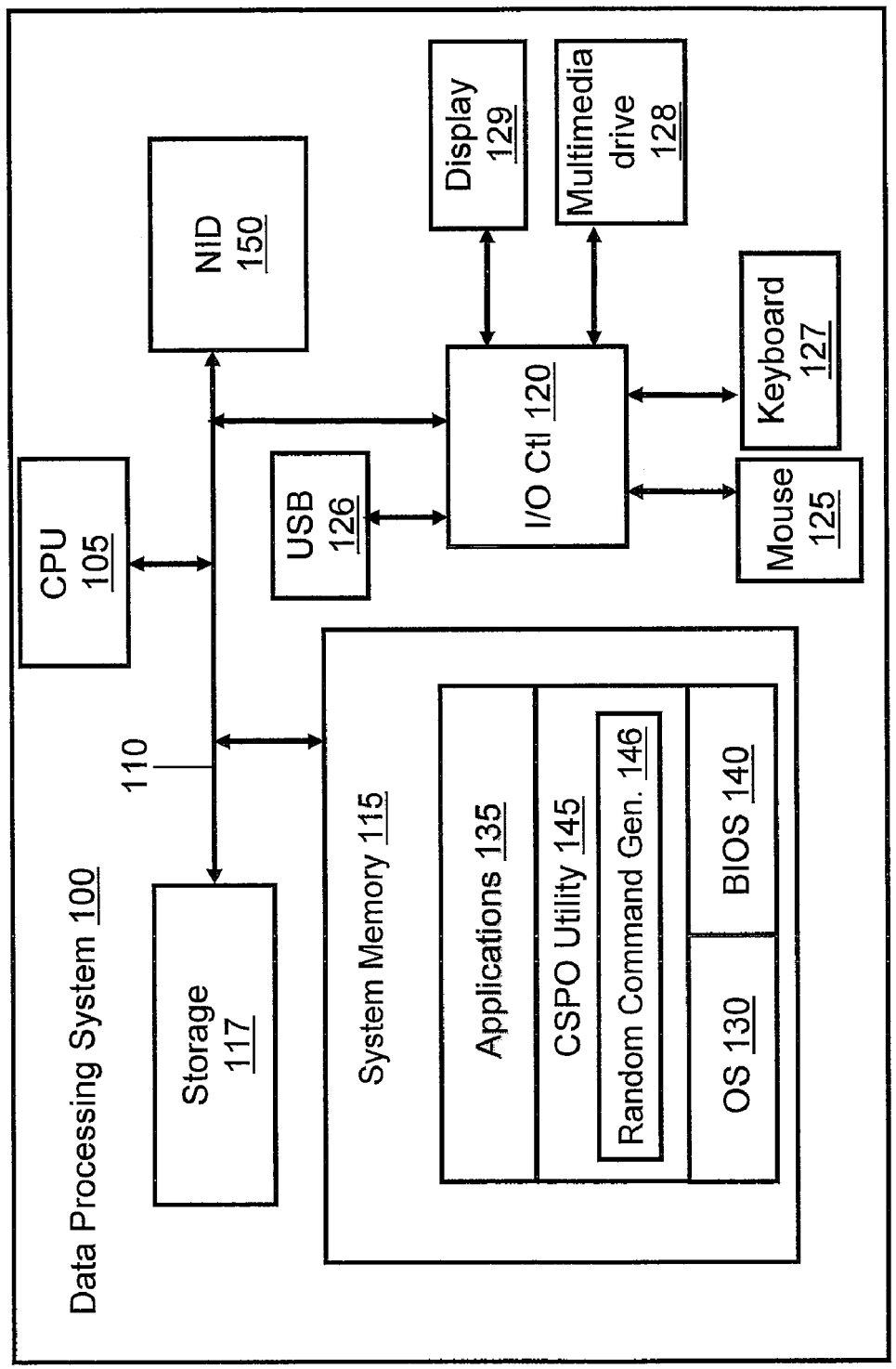
FIG. 1 is a high level block diagram representation of a data processing system, according to one embodiment of the invention.

With reference now to FIG. 1, depicted is a block diagram representation of a data processing system (DPS) 100. DPS 100 comprises at least one processor or central processing unit (CPU) 105 connected to system memory 115 via system interconnect/bus 110. Also connected to system bus 110 is I/O controller 120, which provides connectivity and control for input devices, of which pointing device (or mouse) 125 and keyboard 127 are illustrated, and output devices, of which display 129 is illustrated. Additionally, a multimedia drive 128 (e.g., CDRW or DVDRW drive) and Universal Serial Bus (USB) hub 126 are illustrated, coupled to I/O controller 120. Multimedia drive 128 and USB hub 126 may operate as both input and output (storage) mechanisms. DPS 100 also comprises storage 117, within which data/instructions/code may be stored. DPS 100 is also illustrated with a network interface device (NID) 150 coupled to system bus 110. NID 150 enables DPS 100 to connect to one or more access networks, such as the Internet.

Notably, in addition to the above described hardware components of DPS 100, various features of the invention are completed via software (or firmware) code or logic stored within system memory 115 or other storage (e.g., storage 117) and executed by CPU 105. In one embodiment, data/instructions/code from storage 117 populates the system memory 115, which is also coupled to system bus 110. System memory 115 is defined as a lowest level of volatile memory (not shown), including, but not limited to, cache memory, registers, and buffers. Thus, illustrated within system memory 115 are a number of software/firmware components, including operating system (OS) 130 (e.g., Microsoft Windows®, a trademark of Microsoft Corp; or GNU®/Linux®, registered trademarks of the Free Software Foundation and The Linux Mark Institute; or Advanced Interactive eXecutive -AIX-, registered trademark of International Business Machines—IBM), applications (APP) 135, Basic Input/Output System (BIOS) 140 and ChipSet Parameter Optimization (CSPO) utility 145. BIOS 140 contains the basic routines that help to transfer information between elements within DPS 100 and recognize and configure device drivers for hardware devices, such as hard drives, etc., during boot-up of DPS 100. In actual implementation, components or code of OS 130 and BIOS 140 may be combined with those of CSPO utility 145, collectively providing the various functional features of the invention when the corresponding code is executed by the CPU 105. For simplicity, CSPO utility 145 is illustrated and described as a stand alone or separate software/firmware component, which is stored in system memory 115 to provide/support the specific novel functions described herein.

CPU 105 executes CSPO utility 145 as well as OS 130, which supports the user interface (UI) features of CSPO utility 145. In the illustrative embodiment, CSPO utility 145 facilitates the tuning of a set of chipset parameters to achieve optimal chipset performance under varying workload characteristics. Among the software code/instructions provided by CSPO utility 145, and which are specific to the invention, are: (a) determining a set of workload characteristics of a current workload type; (b) generating an instruction stream (using random command generator 146) using weighted parameters derived from the set of workload characteristics of the current workload type; (c) generating a set of modes and thresholds for a chipset being tested, wherein the combination of modes and thresholds define a combination of chipset parameters; (d) integrating the generated set of modes and thresholds within the instruction stream; (e) loading the instruction stream to one or more processors including a master processor and one or more slave processors; (f) executing the instruction stream for the one or more processors; (g) collecting a set of performance data from an executed instruction stream; (h) comparing the set of performance data of a plurality of different instruction streams having the same set of workload characteristics, wherein each executed instruction stream is executed with one or more different combinations of chipset parameters; and (i) determining the combination of chipset parameters that provides the best performance data for the current workload type.

For simplicity of the description, the collective body of code that enables these various features is referred to herein as CSPO utility 145. According to the illustrative embodiment, when CPU 105 executes CSPO utility 145, DPS 100 initiates a series of functional processes that enable the above functional features as well as additional features/functionality, which are described below within the description of FIGS. 2-3C.

Those of ordinary skill in the art will appreciate that the hardware and basic configuration depicted in FIG. 1 may vary. For example, other devices/components may be used in addition to or in place of the hardware depicted. The depicted example is not meant to imply architectural limitations with respect to the present invention. The data processing system depicted in FIG. 1 may be, for example, an IBM eServer xSeries system, a product of International Business Machines Corporation in Armonk, N.Y., running the AIX operating system or LINUX operating system.

Within the descriptions of the figures, similar elements are provided similar names and reference numerals as those of the previous figure(s). Where a later figure utilizes the element in a different context or with different functionality, the element is provided a different leading numeral representative of the figure number (e.g., 1xx for FIG. 1 and 2xx for FIG. 2). The specific numerals assigned to the elements are provided solely to aid in the description and not meant to imply any limitations (structural or functional) on the invention.

Figure 2:
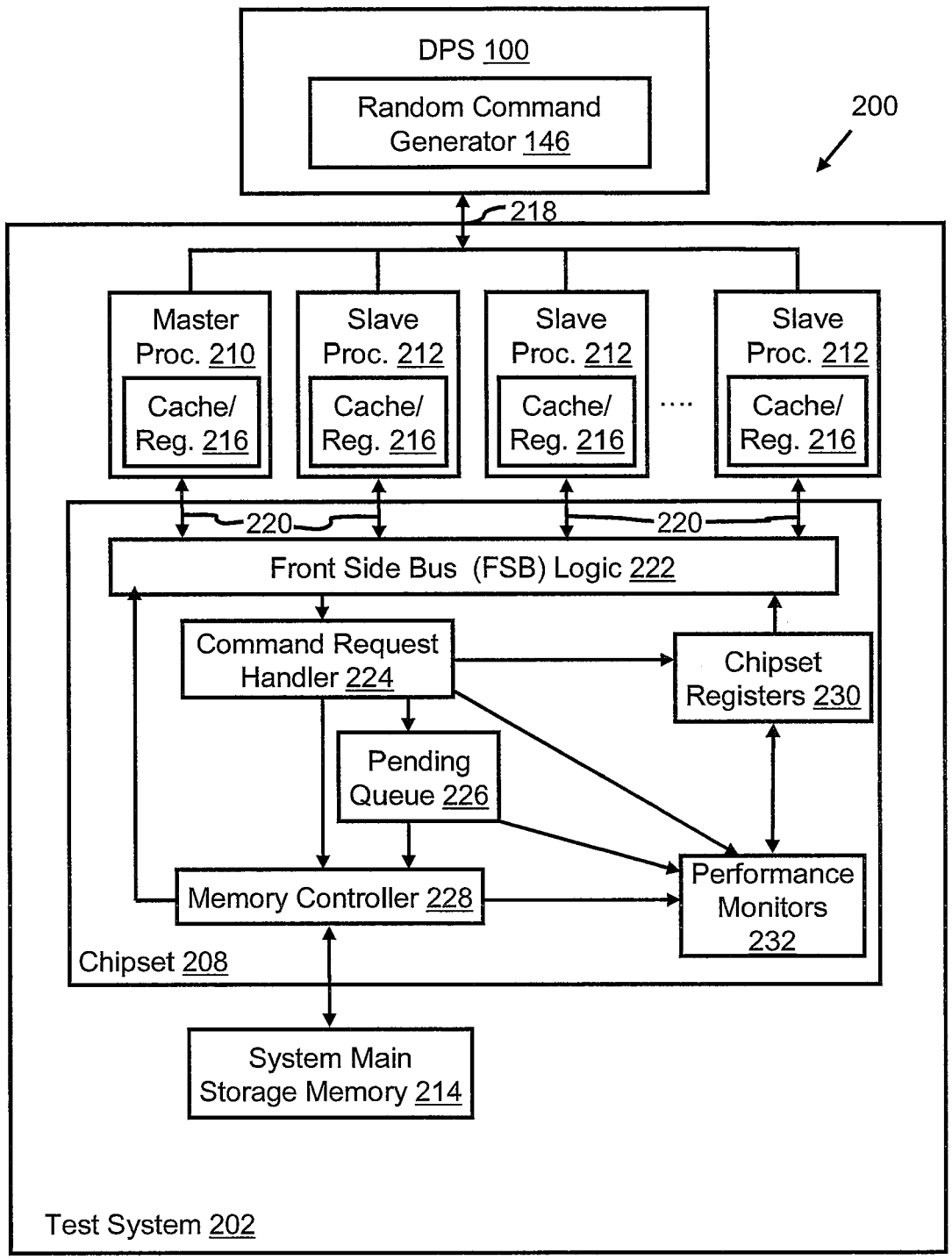
FIG. 2 is a high level block diagram of a chipset tuning optimization architecture, in accordance with one embodiment of the invention.

With reference now to FIG. 2, an exemplary chipset tuning optimization architecture 200 is shown, according to one embodiment of the invention. Chipset tuning optimization architecture 200 includes test system 202 and DPS 100 (FIGS. 1 and 2) running random command generator 146 (FIGS. 1 and 2). Random command generator 146 generates an instruction stream using a set of weighted parameters derived from the workload characteristics. Test system 202 refers to the actual system in which chipset 208 is tested under various workload characteristics. Test system 202 includes master processor 210, one or more slave processors 212, chipset 208, and system main storage memory 214. However, the invention is not limited in this regard, and test system 202 can include any number of processors. For example, an alternate embodiment of test system 202 can include one master processor 210 and no slave processors 212.

Instruction streams are loaded into system main storage memory 214 via write commands to processor registers 216. Read/write commands are sent to processor registers 216 of master processor 210 and slave processors 212, via bus 218. As part of an initial setup of the chipset test, the processors 210, 212 execute read/write commands to system main storage memory 214. In addition, random command generator 206 updates an instruction pointer (not shown) of master processor 210 and slave processors 212. The slave processors 212, under the direction of master processor 210, execute a read command to fetch the first instruction from system main storage memory 214, such that all processors registers 216 are loaded with the same first instruction.

The processors 210, 212 communicate with chipset 208 via front side bus (FSB) 220 and FSB logic 222. FSB logic 222 identifies processor read/write commands and communicates the commands to command request handler 224. The command request handler 224 is responsible for determining where and how (i.e. a partition of chipset register 230, system main storage memory 214, and the like) the read/write commands are communicated. For example, under a slow command path, the command is first placed in pending queue 226 where the command waits to be loaded to memory controller 228. Under a fast command path, the command can be loaded directly to memory controller 228 to reduce latency in loading commands from command request handler 224 to memory controller 228.

Memory controller 228 performs various activities relating to reading and writing from system main storage memory 214. For example, memory controller 228 (i) performs address translation for determining the particular address where the command will be stored in system main storage memory 214, (ii) checks for memory conflicts, and (iii) maintains additional read/write queues. If data is being read from system main storage memory 214, the read data is communicated to FSB logic 222, or alternatively the data is communicated to performance monitor 232. The performance monitor 232 collectively receives and counts performance data (or "events") that can be used to measure the performance of a chipset under certain chipset mode/threshold settings for a particular set of workload conditions. The events/data can include, but are not limited to, number of reads, number of writes, number of HITMs (i.e., HIT modified), and number of collisions from the various portions of the chipset 208. These portions of chipset 208 include, but are not limited to, chipset registers 230, command request handler 224, pending queue 226, and memory controller 228. Moreover, the output from the performance monitor 232 is used to determine performance characteristics. The performance characteristics include, but are not limited to bandwidth, latency, and chipset-induced contention (i.e. retries).

The performance data is passed from performance monitor 232 to chipset registers 230. In addition to storing the performance data, chipset registers 230 also maintain the various mode and threshold settings under which the performance of chipset 208 is tested. Notably, the mode/threshold settings stored in chipset registers 230 can be modified to store a different combination of mode/threshold settings. The idea is to test chipset 208 with multiple different mode/threshold settings that are integrated in an instructions stream to determine which mode/threshold setting combination produces the best performance data for a particular workload type.

Chipset registers 230 include register addresses (not shown) with which the collected performance data is accessed by master processor 210. When master processor 210 and slave processors 212 are initially released to execute instructions from the instruction stream, the processors will execute a write command to chipset registers 230 to initiate performance monitor 232. Once the instruction streams have been executed by processors 210, 212 for a predetermined number of loops, master processor 210 executes a stop command to halt performance monitor 232, extracts the performance monitor data that was passed from performance monitor 232 to chipset registers 230, and stores the performance data into system main storage memory 214.

Figure 3A:
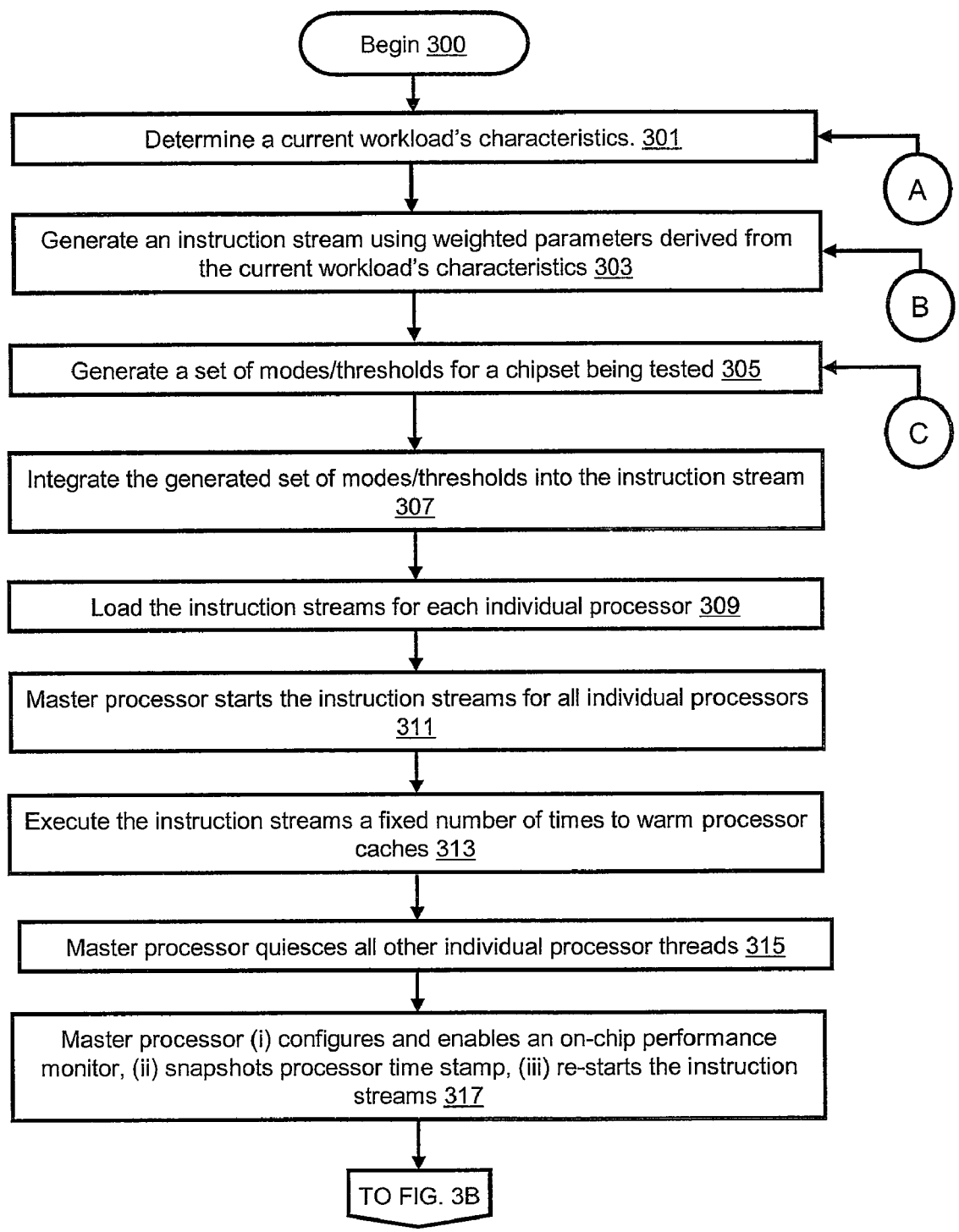
FIGS. 3A-3C represent individual parts of a high level logical flowchart illustrating the method of tuning a set of chipset parameters to achieve optimal chipset performance under varying workload characteristics, in accordance with one embodiment of the invention.
Figure 3B:
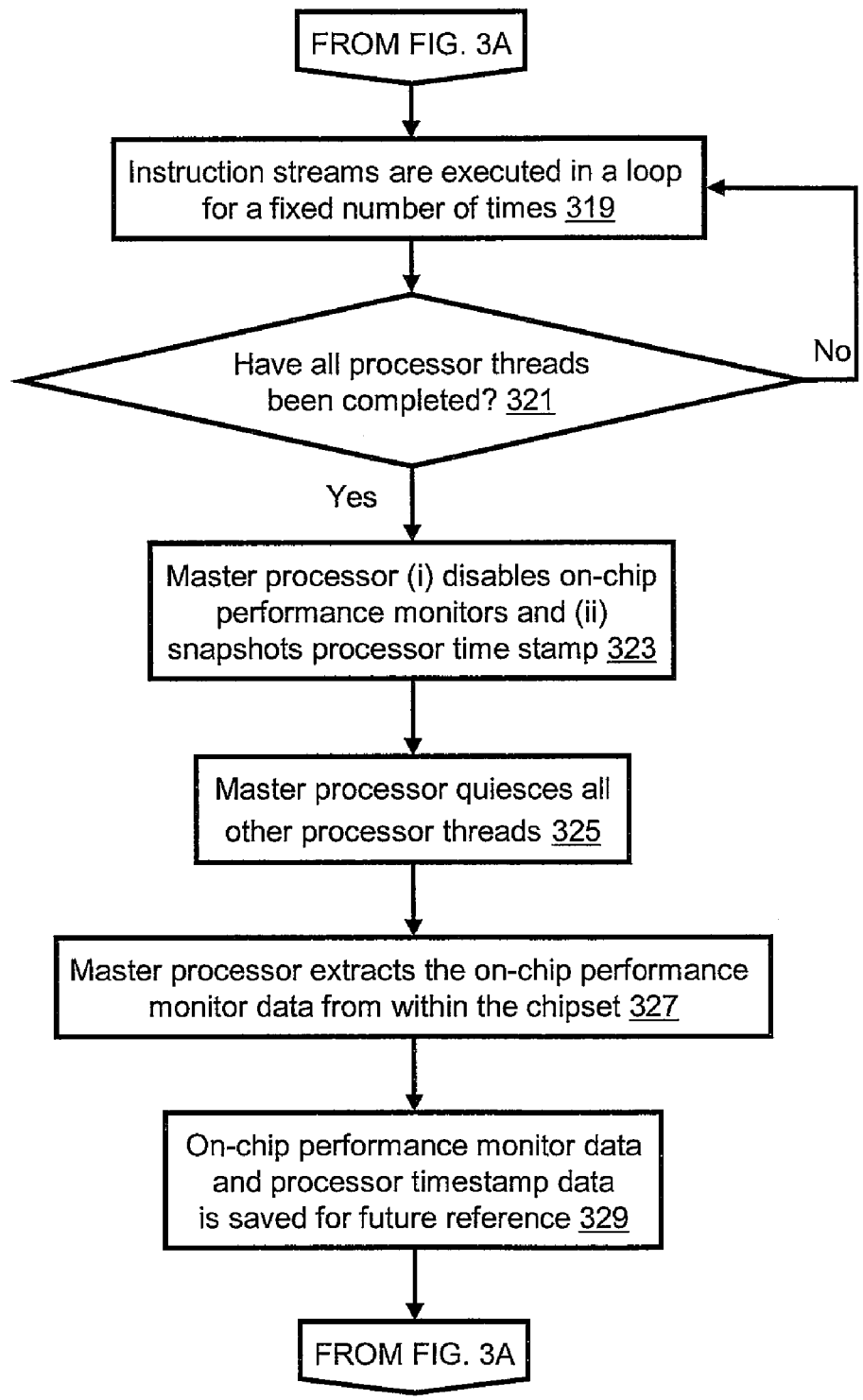
Figure 3C:
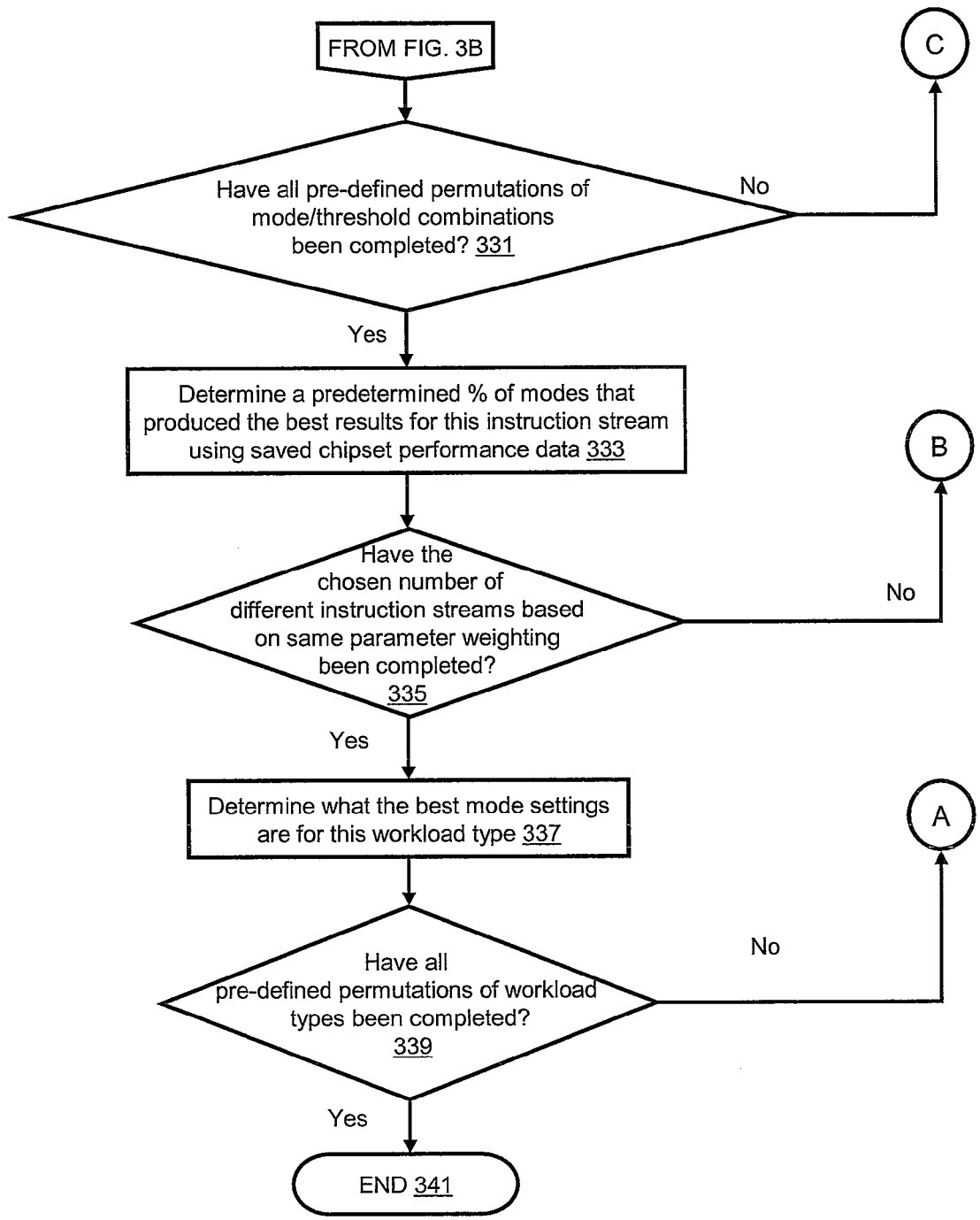

FIGS. 3A-3C represent portions of a flow chart illustrating the exemplary method of tuning a set of chipset parameters to achieve optimal chipset performance under varying workload characteristics, according to an illustrative embodiment of the invention. Although the following methods illustrated in FIGS. 3A-3C may be described with reference to components shown in FIGS. 1-2, it should be understood that this exemplary method is merely for convenience and alternative components and/or configurations thereof can be employed when implementing the various methods. Key portions of the methods may be completed by CSPO utility 145 (FIG. 1). CSPO utility 145 executes within DPS 100 (FIG. 1). Moreover, CSPO utility 145 controls specific operations of/on DPS 100 (FIG. 1) and chipset tuning optimization architecture 200 (FIG. 2). Thus, the methods are described from the perspective of CSPO utility 145, DPS 100, and/or chipset tuning optimization architecture 200.

The process of FIG. 3 begins at initiator block 300 and proceeds to block 301, in which a chipset designer/evaluator determines a set of workload characteristics for a particular workload type that the chipset designer/evaluator is attempting to emulate. As used herein, the term emulate refers to the activity of imitating a first computer system by using a second software system, often including a microprogram or another computer that enables the second software system to perform the same workload (i.e., run the same applications) as the first computer system. Examples of workload characteristics include, but are not limited to, characteristics associated with ratios, addresses, and burstiness. With regard to burstiness, the characteristic is typically associated with events that include, but are not limited to, reads, writes, HITMs, castouts, streaming of reads and writes, and the like.

Once the workload characteristics have been determined, a test instruction stream is generated based on a set of weighted parameters (e.g., number of reads, number of writes, number of HITMs, etc.) derived from the workload characteristics, as depicted in block 303. The weighted parameters drive random command generator 206 (FIG. 2), which is responsible for generating the test instruction stream that reflects a particular set of workload characteristics. Moreover, the command traffic generated by random command generator 206 should be comparable to what would be typically seen from a particular application/workload type (e.g., commercial workloads, numerically intensive workloads, etc.).

In addition to the test instruction stream being generated, a set of chipset modes and/or thresholds are also generated by the chipset designer, as depicted in block 305. The set of generated mode/threshold values are used to modify the mode/threshold values currently stored in chipset registers 230 (FIG. 2). The generated set of modes/thresholds is typically integrated into the test instruction stream at a first portion of a command sequence of the test instruction stream, as shown in block 307. The first portion of the command sequence is responsible for modifying the chipset modes/thresholds in chipset registers 230.

The test instruction streams containing the chipset modes/thresholds are then loaded into each processor 210, 212 (FIG. 2), as depicted in block 309. An arbitrarily designated master processor 210 (FIG. 2) initiates the execution of the test instruction stream and directs the activities of one or more slave processors 212 (FIG. 2) to execute the test instruction stream, as shown in block 311. Master processor 210 and slave processors 212 execute their respective test instruction streams a fixed number of times to ensure that each of their processor caches/registers 216 (FIG. 2) are loaded with a common start registry configuration before a performance test of the modified chipset 208 is initiated, as depicted in block 313. Therefore, the first time a command stream is executed, processors 210, 212 must typically fetch the command instructions from system main storage memory 214 (FIG. 2), where the instruction stream is stored. However, as the instruction stream is re-executed in a loop, processors 210, 212 locally maintain a portion of the executed instruction stream in processor cache/registers 216. In this way, processors 210, 212 no longer have to fetch the command portions from system main storage memory 214. Master processor 210 then temporarily disables (or "quiesces") processor threads of all other slave processors 212 in advance of the performance test, as depicted in block 315.

Referring to block 317, master processor 210 executes commands to: (i) configure and enable performance monitor 232 (FIG. 2), (ii) record a processor time stamp associated with a start time of the performance test, and (iii) re-start the execution of the same instruction streams in master processor 210 and all slave processors 212. Performance monitors 232 are assigned to different components on chipset 208 to count particular events/performance data inside the chipset 208 (i.e., number of reads, number of writes, number of HITMs, number of collisions). Considering that there are possibly hundreds of events that can occur in the execution of the test instruction stream, it would not be cost effective to monitor all events. Therefore, chipset designers/evaluators typically select on a priority basis only those events that provide an adequate picture of how the command traffic is moving through chipset 208. The event/performance data that is monitored by performance monitor 232 is passed to chipset registers 230 for subsequent analysis. In this regard, the invention is not limited to the particular order in which the event information is monitored or passed (i.e., not all events need to be monitored in a single execution run). The event/ performance data that is then passed by performance monitor 232 is analyzed to determine one or more performance characteristics (i.e. bandwidth, latency, and chipset-induced contention).

Referring now to block 319 of FIG. 3B, the same test instruction streams are re-executed in a loop for a fixed number of times. The test instruction stream loops cumulatively, while performance monitor 232 continues to be enabled. Looping the execution of the same test instruction stream for a fixed number of times provides a way for performance monitor 232 to attain a larger sample time with which to evaluate chipset performance. A determination is made whether all of the processor threads have been completed for the fixed number of times, as depicted in block 321. If not all of the processor threads have been completed, the re-execution of test instruction streams continues.

Once all of the processor threads have been completed, master processor 210 disables performance monitors 232 and records the processor time stamp associated with an end time of the performance test, as depicted in block 323. In addition, the master processor 210 quiesces all other processor threads, as shown in block 325. Moreover, master processor 210 extracts performance monitor data from within chipset 208, as depicted in block 327. The extraction is typically performed via the Memory-Mapped Input/Output (MMIO) commands of master processor 210 to chipset registers 230 to read the total number of cycles that were executed and count the number of events (e.g., number of reads/writes/HITMs, collisions, etc.). The performance monitor data and processor time stamp associated with the end time is saved for future reference, usually in system main storage memory 214, as shown in block 329.

With reference now to FIG. 3C, the method continues to block 331, in which a determination is made whether all pre-defined permutation combinations of modes/thresholds have been completed. In order to optimize the performance of chipset 208 under a given workload type, it is usually necessary to test chipset 208 by integrating a different combination (s) of mode/thresholds with the same instruction stream corresponding to the same workload type. The new instruction stream containing the modified set of modes/thresholds is run by the master processor 210 and slave processors 212, and the chipset's performance is monitored. If not all pre-defined permutation combinations of modes/thresholds have been completed, the previous steps described in blocks 305-317 are repeated. Once all pre-defined permutation combinations of modes/thresholds have been completed, the chipset designer/evaluator determines a predetermined percentage of mode/threshold combinations that produced the best performance results when integrated with the same instruction stream and run through processors 210, 212, as depicted in block 333. As used herein, the best mode/threshold combinations refers generally to those combinations of modes/thresholds that result in favorable performance characteristics for the chipset 208 under test. Such favorable performance characteristics can include, but are not limited to chipsets having the: highest bandwidth, lowest latency, and/or fewest retries. To further exemplify this concept, a "quick" heuristic can be the amount of time it takes for a performance test iteration to be completed.

Up to this point, chipset 208 has been tested for a single type of workload type and for the same randomly generated instruction stream, while only varying the chipset modes/thresholds. However, since the instruction stream is randomly generated for a given set of workload characteristics, there is the possibility that the instruction stream may not fully reflect the average instruction stream that is characteristic of the workload type. For this reason, chipset 208 is tested using different instruction streams utilizing the same weighted parameters derived from the workload characteristics. When random command generator 206 generates another instruction stream with the same weighted parameters, chipset 208 will be tested using the same combinations of modes/thresholds that were used in testing the previous instruction stream. Thus, a determination is made whether the chosen number of different instruction streams based on the same weighted parameters have been run and monitored for performance, as depicted in decision block 335. If not all of the randomly generated instruction streams based on the same weighted parameters have been run and tested, method steps 303-333 are repeated. Once processors 210, 212 have completed their testing runs of all of the randomly generated instruction streams and the chipset's performance data has been recorded, the chipset designer/evaluator determines the best mode/threshold settings for a first workload type, as depicted in block 337.

After the optimal combination of modes/thresholds has been determined for a first workload type, the method continues to decision block 339. According to decision block 339, a determination is made whether the optimal combination of modes/thresholds has been determined for all pre-defined permutation workload types. If the optimal combination of modes/thresholds has not been determined for all workload types, method steps 301-337 are repeated. The method terminates at block 341.

According to another embodiment of the invention, once the optimal chipset mode/threshold settings have been determined for a potential workload type, a computer's Basic Input/Output System (BIOS) 140 (FIG. 1) programs the chipset mode/threshold settings based upon an actual workload type. As used herein, an actual workload type refers to a workload type that is actually being run through a chipset after the optimal combination of chipset parameters for each potential workload type has been identified. Since the aforementioned step is dependant upon the identification of the workload type, the workload type is identified either by: (i) the user or (ii) CSPO utility 145 (FIG. 1). In the instance that the user is unable to identify the workload type, CSPO utility 145 gathers chipset performance data and interprets the chipset performance data to determine an optimal combination of chipset modes/thresholds (or chipset parameters) for BIOS 140 to set on a subsequent Initial Program Load (IPL). In this regard, CSPO utility 145 detects changes or shifts in workload type over time and raises an interrupt to a System Management Interrupt (SMI) handler. The SMI handler then modifies the chipset modes/thresholds to the optimal settings for the new workload type.

In the flow chart above (FIGS. 3A-3C), one or more of the methods are embodied in a computer readable medium containing computer readable code such that a series of steps are performed when the computer readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be further appreciated, the processes in embodiments of the present invention may be implemented using any combination of software, firmware, or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. By way of example, a non-exclusive list of types of media includes recordable-type (tangible) media such as floppy disks, thumb drives, hard disk drives, CD ROMs, DVD ROMs, and transmission-type media such as digital and analog communication links.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for tuning a set of chipset parameters to achieve optimal chipset performance under varying workload characteristics comprising:
   determining a set of workload characteristics of a current workload type;
   generating an instruction stream using weighted parameters derived from the set of workload characteristics of the current workload type;
   generating a set of modes and thresholds for a chipset being tested, wherein the combination of modes and thresholds define a combination of chipset parameters;
   integrating the generated set of modes and thresholds within the instruction stream;
   loading the instruction stream to one or more processors including a master processor and one or more slave processors;
   executing the instruction stream for the one or more processors;
   collecting a set of performance data from an executed instruction stream;
   comparing the set of performance data of a plurality of different instruction streams having the same set of workload characteristics, wherein each executed instruction stream is executed with one or more different combinations of chipset parameters; and
   determining the combination of chipset parameters that provides the best performance data for the current workload type.

2. The method of claim 1, further comprising:
   quiescing processor threads of the one or more processors;
   configuring and enabling a performance monitor for collecting the set of performance data;
   determining a processor start time to mark the start of the re-execution of the previously quiesced processor threads;
   re-executing the previously quiesced processor threads;
   collecting the performance data from the re-executed processor threads;
   completing re-execution of the processor threads of the at least one processor;
   disabling the performance monitor to stop collecting the set of performance data; and
   re-quiescing processor threads of the at least one processor; and
   determining a processor end time to mark the completion of the re-executed processor threads.

3. The method of claim 1, further comprising:
   detecting an actual workload type;
   gathering a chipset performance data corresponding to the actual workload type; and
   interpreting the chipset performance data to determine an optimal combination of chipset parameters for a Basic Input/Output System (BIOS) to set on a subsequent Initial Program Load (IPL).

4. The method of claim 3, further comprising:
   detecting a change or a shift in an actual workload type; and
   responsive to the change or the shift in the actual workload type, raising an interrupt to a System Management Interrupt (SMI) handler; and
   modifying the chipset parameters to an optimal combination of chipset parameters.

5. A computer system comprising:
   a processor unit;
   a memory coupled to the processor unit; and
   a ChipSet Parameter Optimization (CSPO) utility executing on the processor unit and having executable code for:
   determining a set of workload characteristics of a current workload type;
   generating an instruction stream using weighted parameters derived from the set of workload characteristics of the current workload type;
   generating a set of modes and thresholds for a chipset being tested, wherein the combination of modes and thresholds define a combination of chipset parameters;

integrating the generated set of modes and thresholds within the instruction stream;

loading the instruction stream to one or more processors including a master processor and one or more slave processors;

executing the instruction stream for the one or more processors;

collecting a set of performance data from an executed instruction stream;

comparing the set of performance data of a plurality of different instruction streams having the same set of workload characteristics, wherein each executed instruction stream is executed with one or more different combinations of chipset parameters; and determining the combination of chipset parameters that provides the best performance data for the current workload type.

6. The computer system of claim 5, the CSPO utility further having executable code for:

quiescing processor threads of the one or more processors;

configuring and enabling a performance monitor for collecting the set of performance data;

determining a processor start time to mark the start of the re-execution of the previously quiesced processor threads;

re-executing the previously quiesced processor threads;

collecting the performance data from the re-executed processor threads;

completing re-execution of the processor threads of the at least one processor;

disabling the performance monitor to stop collecting the set of performance data; and re-quiescing processor threads of the at least one processor; and determining a processor end time to mark the completion of the re-executed processor threads.

7. The computer system of claim 5, the CSPO utility further having executable code for:

detecting an actual workload type;

gathering a chipset performance data corresponding to the actual workload type; and interpreting the chipset performance data to determine an optimal combination of chipset parameters for a Basic Input/Output System (BIOS) to set on a subsequent Initial Program Load (IPL).

8. The computer system of claim 7, the tree control utility further having executable code for:

detecting a change or a shift in an actual workload type; and responsive to the change or the shift in the actual workload type, raising an interrupt to a System Management Interrupt (SMI) handler; and modifying the chipset parameters to an optimal combination of chipset parameters.

9. A computer program product comprising:

a computer storage medium; and program code on the computer storage medium that when executed provides the functions of:

determining a set of workload characteristics of a current workload type;

generating an instruction stream using weighted parameters derived from the set of workload characteristics of the current workload type;

generating a set of modes and thresholds for a chipset being tested, wherein the combination of modes and thresholds define a combination of chipset parameters;

integrating the generated set of modes and thresholds within the instruction stream;

loading the instruction stream to one or more processors including a master processor and one or more slave processors;

executing the instruction stream for the one or more processors;

collecting a set of performance data from an executed instruction stream;

comparing the set of performance data of a plurality of different instruction streams having the same set of workload characteristics, wherein each executed instruction stream is executed with one or more different combinations of chipset parameters; and determining the combination of chipset parameters that provides the best performance data for the current workload type.

10. The computer program product of claim 9, the program code further provides the functions of:

quiescing processor threads of the one or more processors;

configuring and enabling a performance monitor for collecting the set of performance data;

determining a processor start time to mark the start of the re-execution of the previously quiesced processor threads;

re-executing the previously quiesced processor threads;

collecting the performance data from the re-executed processor threads;

completing re-execution of the processor threads of the at least one processor;

disabling the performance monitor to stop collecting the set of performance data; and re-quiescing processor threads of the at least one processor; and determining a processor end time to mark the completion of the re-executed processor threads.

11. The computer program product of claim 9, the program code further provides the functions of:

detecting an actual workload type;

gathering a chipset performance data corresponding to the actual workload type; and interpreting the chipset performance data to determine an optimal combination of chipset parameters for a Basic Input/Output System (BIOS) to set on a subsequent Initial Program Load (IPL).

12. The computer program product of claim 11, the program code further provides the functions of:

detecting a change or a shift in an actual workload type; and responsive to the change or the shift in the actual workload type, raising an interrupt to a System Management Interrupt (SMI) handler; and modifying the chipset parameters to an optimal combination of chipset parameters.

* * * * *